United States Patent [19]
Murphy, Jr. et al.

[11] 3,970,099
[45] July 20, 1976

[54] LIQUID LEVEL RESPONSIVE VENT VALVE

[75] Inventors: Frank W. Murphy, Jr.; J. David Nunneley, both of Tulsa; Teddy Howard Cruse, Broken Arrow, all of Okla.

[73] Assignee: Frank W. Murphy Manufacturer, Inc., Tulsa, Okla.

[22] Filed: Jan. 6, 1976

[21] Appl. No.: 646,936

Related U.S. Application Data
[63] Continuation-in-part of Ser. No. 608,279, Aug. 27, 1975, abandoned.

[52] U.S. Cl. ............................ 137/101.25; 137/446
[51] Int. Cl.² .................. F16K 31/18; F16K 33/00; G05D 9/00
[58] Field of Search ............... 137/101.25, 213, 214, 137/409, 412, 434, 446, 386; 251/251, 260, 261, 344, 343; 4/DIG. 1, 56

[56]  References Cited
UNITED STATES PATENTS

| | | | |
|---|---|---|---|
| 974,997 | 11/1910 | Shorb et al. ........................ | 137/446 |
| 2,842,335 | 7/1958 | Cousins .............................. | 137/446 |
| 2,995,144 | 8/1961 | Manning et al. .................... | 251/343 |
| 3,506,034 | 4/1970 | Branton ............................. | 251/251 |

*Primary Examiner*—Martin P. Schwadron
*Assistant Examiner*—G. Walton
*Attorney, Agent, or Firm*—D. Paul Weaver

[57]  ABSTRACT

An automatic vent valve for pneumatic control systems of compressors or the like allows a compressor to be shut down when the level of liquid in an associated gas scrubber reaches a certain level. The device is also applicable to pressure vessels, boilers or similar devices requiring level control. A pneumatic vent valve responds to float movement through a simplified direct-acting mechanism having a sealed shaft between the float and vent chambers.

11 Claims, 9 Drawing Figures

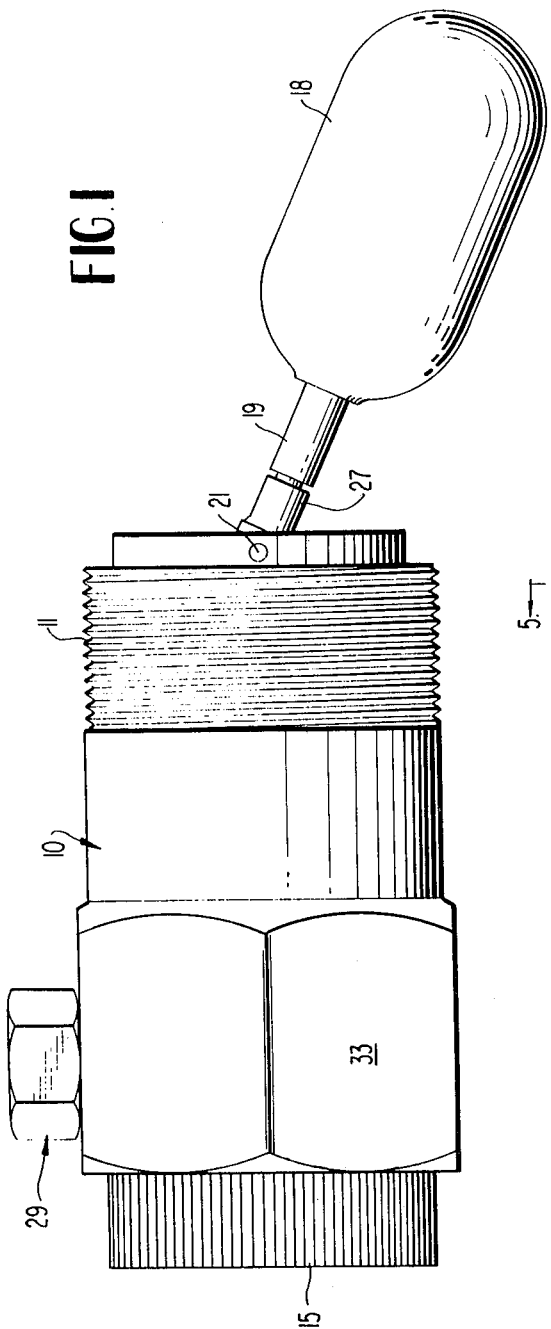
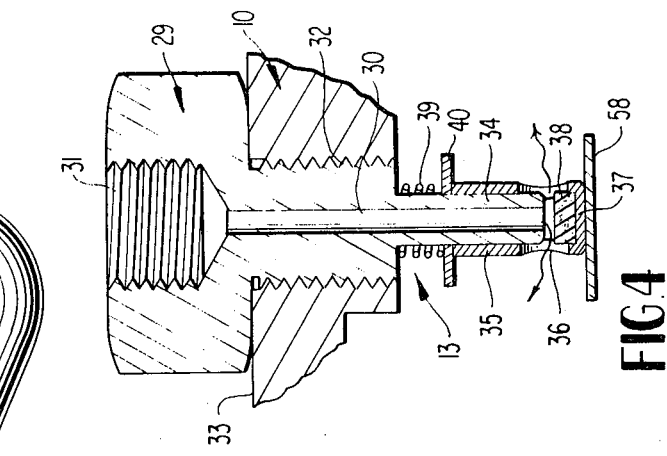
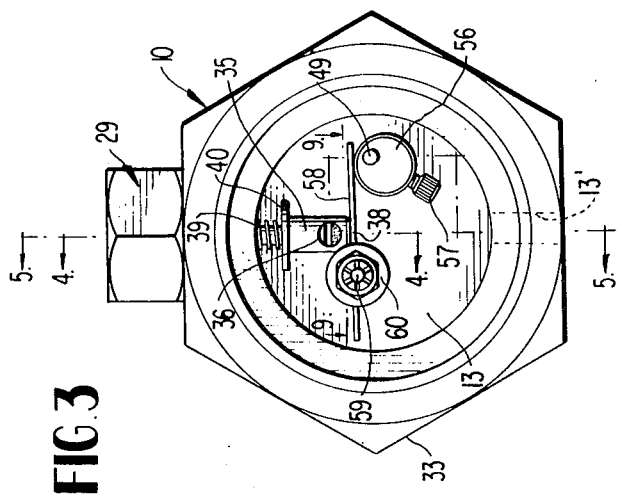
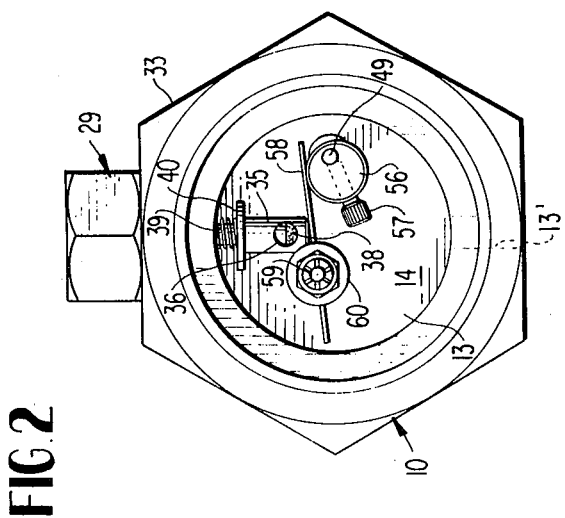

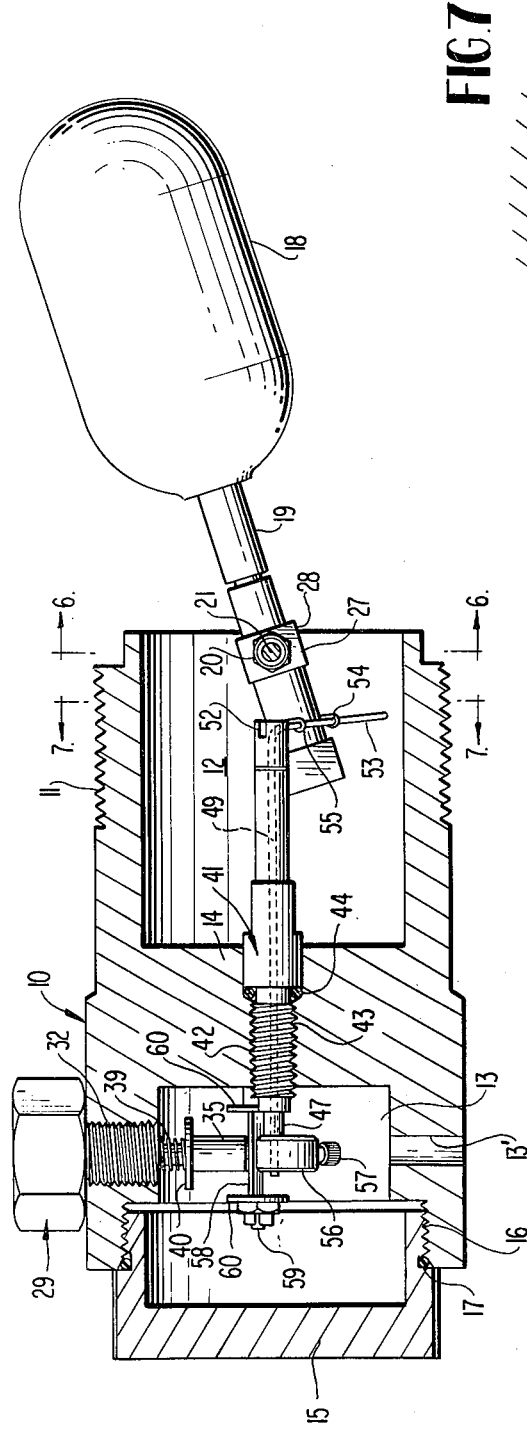
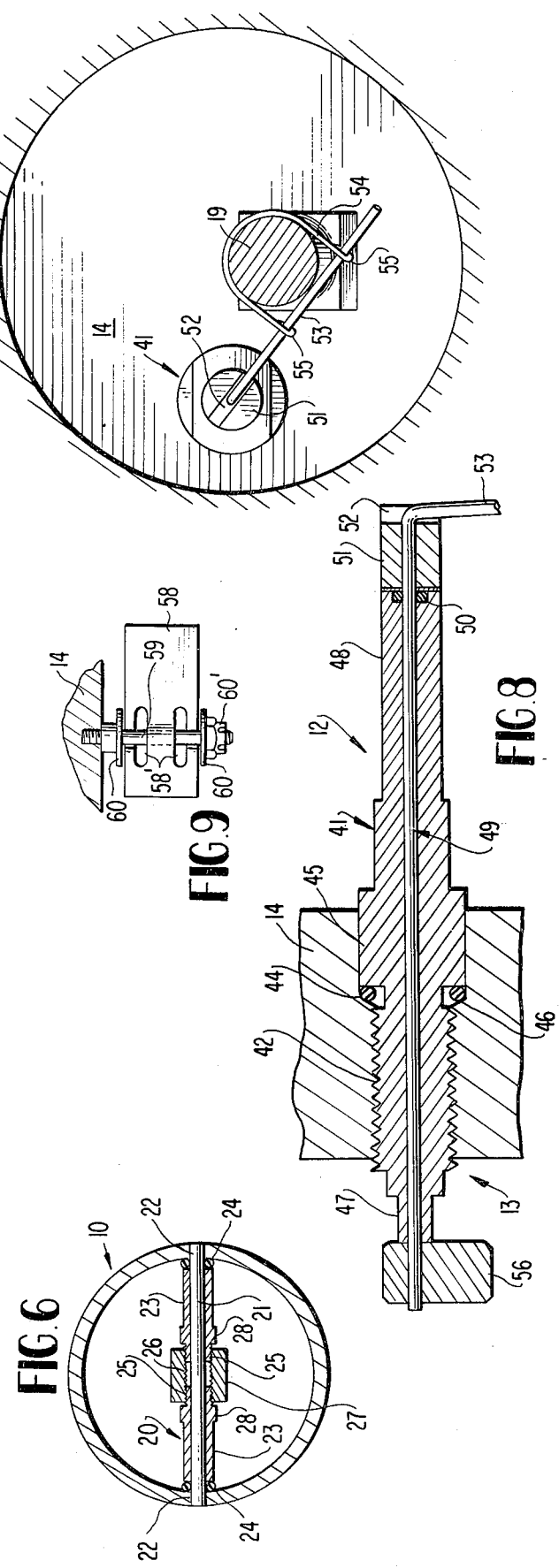

LIQUID LEVEL RESPONSIVE VENT VALVE

CROSS-REFERENCE TO RELATED APPLICATION

This application is a continuation-in-part of application Ser. No. 608,279, filed Aug. 27, 1975, now abandoned, for LIQUID LEVEL RESPONSIVE VENT VALVE.

BACKGROUND OF THE INVENTION

In the natural gas and hydrocarbon processing industry, it is frequently necessary to scrub or filter gas before admitting it to a piston type compressor, in order to prevent condensation from reaching the dew point under compression and thereby damaging the compressor mechanism. Gas scrubbers for this purpose must be constantly monitored so that when the liquid removed from the gas reaches a high level, the associated compressor is shut down.

The device of the invention is employed in this environment and is utilized to control a pneumatic vent valve in the pneumatic system which controls the operation of a compressor. By substituting a microswitch for the vent valve, the device can be caused to control an electrical control circuit for machinery rather than a pneumatic control circuit.

The objective of the invention is to provide a liquid level responsive pneumatic vent valve particularly for use in the hydrocarbon processing industry which is characterized by ruggedness and durability, simplicity of construction, and reliability of operation. The invention features a simplified, compact and direct-acting drive linkage between a pivoted float and the reciprocating sleeve element of the vent valve. A uniquely sealed shaft arrangement is employed between the float chamber of the mechanism housing and the pneumatic vent chamber at the other end of the housing.

Other features and advantages of the invention will become apparent during the course of the following description.

BRIEF DESCRIPTION OF DRAWING FIGURES

FIG. 1 is a side elevation of a liquid level responsive vent valve assembly according to the invention.

FIG. 2 is an end elevation thereof with an end cap removed for clarity.

FIG. 3 is a similar end elevation of the assembly in a venting mode responsive to a high level of liquid in a gas scrubber or the like.

FIG. 4 is an enlarged vertical section taken on line 4-4 of FIG. 3 and showing details of the pneumatic vent valve sub-assembly.

FIG. 5 is a vertical section through the entire assembly when in the venting mode taken on line 5—5 of FIG. 3.

FIG. 6 is a transverse vertical section taken on line 6—6 of FIG. 5 and showing details of the float arm pivot.

FIG. 7 is a similar view taken on line 7—7 of FIG. 5.

FIG. 8 is an enlarged central vertical section taken through the sealed shaft assembly which transmits float movement to the vent valve sleeve element.

FIG. 9 is a fragmentary vertical section taken on line 9—9 of FIG. 3.

DETAILED DESCRIPTION

Referring to the drawings in detail wherein like numerals designate like parts throughout, the numeral 10 designates a sturdy housing or body portion formed of brass or the like and externally threaded at 11 near one end for engagement in a threaded port of a gas scrubber, pressure vessel, or the like, not shown. At its same end, the housing 10 has a float arm chamber 12 communicating directly with the liquid chamber of the gas scrubber on which the device is employed. At its other end, the housing 10 has a vent chamber 13 to which air from the pneumatic control system of a compressor or the like, not shown, is vented by valve means, to be described, in response to a certain level of liquid in the scrubber on which the housing 10 is mounted. The vent chamber 13 is separated from the chamber 12 by an intervening heavy wall 14 of the housing, and there can be no fluid communication between the two chambers since they are sealed off by shaft means, to be described. A removable end cap 15 for the chamber 13 has threaded engagement with the housing at 16, and has an O-ring seal 17. The chamber 13 is vented to atmosphere by a suitable vent port 13' formed through the housing side wall, FIG. 5.

A float element 18 projects from the housing 10 into the liquid chamber or tank of the gas scrubber, not shown. The float element 18 is secured to an arm 19 pivoted to the adjacent end of housing 10 by a pivot shaft assembly 20 shown in full detail in FIG. 6.

This pivot shaft assembly comprises a solid shaft or pin 21 having its ends received by diametrically aligned openings 22 in the housing 10. Axially opposing sleeves 23 are rotatably mounted on the pin 21 and have their outer ends engaging O-ring seals 24 on the pin 21, the seals engaging the cylindrical wall of the housing 10. The inner end portions of the sleeves 23 are threaded as at 25 for reception in the screw-threaded cross bore 26 of a head element 27 on the float arm 19. The sleeves have hex head portions 28 thereon engageable with a wrench for turning the sleeves in relation to the threaded head 27. When the sleeves 23 are adjusted outwardly on the shaft 21, they will compress the O-rings 24 and the latter will frictionally engage the wall of housing 10 and also frictionally engage the pin or shaft 21 and this friction may be adjusted to provide a light drag on the relatively movable parts. However, the action of the float 18 in rising and falling can easily overcome this drag so that free pivoting of the float in response to liquid level changes in the scrubber will not be impeded. The shaft assembly 20 is thus constructed with an adjustable friction drag feature which also prevents separation of the pin 21 from the sleeves 23 or from the openings 22 until the sleeves 23 are adjusted inwardly to relieve compression on the O-rings 24. If preferred, a simple cross pin pivot for the float arm 19 on the housing 10 may be utilized without the assembly and adjustment features shown in FIG. 6.

Near the end of the housing 10 having the vent chamber 13 is a threaded fitting 29 having an axial bore 30 extending therethrough and an outer end threaded opening 31 communicating with the bore 30 and adapted for coupling in the pneumatic control system of a compressor or the like, not shown. The axis of the fitting 29 is perpendicular to the longitudinal axis of housing 10 and the fitting is received by a threaded opening 32 formed through the housing side wall and intersecting the chamber 13. At this region on the housing 10, the same is preferably hexagonally-shaped as at 33 to accommodate a wrench used to insert the threads 11 into a threaded opening in the liquid tank of a gas scrubber or the like.

A reduced tubular extension 34 on the fitting 29 projects into the chamber 13 and receives thereon slidably a sleeve valve element 35 having a transverse vent port 36 and an end wall 37 immediately inwardly of the vent port. Fixed to the end wall is a rubber-like compressible valve element or seal 38 adapted to engage and close the adjacent end of bore 30, in a mode of operation to be further described. The sleeve valve element is biased inwardly toward the center of the chamber 13 by a compression spring 39 bearing against a flat washer 40, which in turn bears against the inner end of sleeve valve element 35. The washer 40 is also slidable on the tubular extension 34. FIG. 4 shows the valve seal 38 unseated, allowing the vent valve to vent the associated pneumatic control system for a compressor or the like into the chamber 13 of housing 10 to thereby shut down the compressor responsive to the liquid level in a scrubber rising to a certain point which will elevate the float 18 to a position as illustrated in FIG. 5. When the float is lowered as in FIG. 1, mechanism now to be described will cause the closing of the pneumatic vent valve or seating of the compressible seal 38 against the opposing end of extension 34 to thereby cover the bore 30.

The interconnecting mechanism between the pivoted float 18 and the reciprocatory valve sleeve 35 forms a key part of the invention and comprises an outer shaft section 41 having a threaded portion 42 received in a threaded central axial opening 43 in the housing wall 14. An O-ring seal 44 is interposed between the end face of a cylindrical portion 45 of shaft section 41 and an internal shoulder 46 of the housing wall 14. By this arrangement, the outer shaft section 41 is effectively sealed between the two chambers 12 and 13 which are exposed, respectively, to liquid and gas (air). The wall 14, in effect, comprises the interface member between the liquid and pneumatic systems with which the invention is utilized as a monitoring means. As shown in the drawings, one reduced end extension 47 of shaft section 41 projects into the vent chamber 13 while the other reduced end portion 48 of shaft section 41 extends axially in the chamber 12.

An interior slender shaft section 49 is received rotatably in the bore of outer shaft section 41 and extends entirely therethrough and into the two chambers 12 and 13. The inner shaft section 49 is effectively sealed relative to the shaft section 41 by an O-ring seal 50, FIG. 8. In the chamber 12, a short sleeve element 51 is mounted on the shaft section 49 to turn therewith relative to the stationary shaft section 41. This sleeve element has a cross slot 52 in its outer end receiving a transverse crank extension 53 of inner shaft section 49.

As best shown in FIG. 7, a U-shaped connecting element 54 extends about the interior end portion of float arm 19 and is slidably engaged therewith. Its two arms have eyes 55 which slidably receive crank extension 53 of inner shaft section 49, whereby pivoting of the float 18 on the transverse axis of cross shaft assembly 20 will produce turning of the crank extension 53 and corresponding rotation of interior shaft section 49.

An eccentric adjustable cam element 56 is secured to the end of inner shaft section 49 in vent chamber 13 by a set screw 57. A rocker plate 58 within the vent chamber 13 is pivoted on a threaded stub shaft 59, FIG. 9, which is anchored at one threaded end to the housing wall 14. The rocker plate 58 has bearing elements 58' struck from the material thereof which rotatably engage the shaft 59, and preferably the rocker plate 58 is centered between a pair of plastic washers 60 on the shaft 59 for stability and free pivotal operation. A stop nut 60' is carried by the outward threaded end of shaft 59 to maintain the parts properly assembled. The axis of fixed stub shaft 59 is parallel to the axis of shaft section 49 but offset laterally therefrom, as shown. Likewise, the axis of shaft 49 is offset relative to the axis of float arm 19, FIG. 7.

The rocker plate 58, FIGS. 2, 3 and 5, is held in constant contact with the periphery of eccentric cam 56 by the action of spring 39, and likewise, the end wall 37 of valve sleeve 35 is also held constantly in sliding contact with rocker plate 58. By this means, rising and falling of the float 18 responsive to liquid level changes in a scrubber will impart rotation to shaft section 49 and cam 56, in turn rocking plate 58 on the axis of stub shaft 59, causing reciprocation of valve sleeve 35 to open or close the pneumatic vent valve shown in FIG. 4, as the case may be. In the illustrated high liquid level control, when the float 18 is down, the vent valve will be closed by the seating of seal 38 against the end of extension 34. When the float 18 is up, FIG. 5, the sleeve valve element 35 will descend, FIG. 4, and the vent valve will vent the pneumatic control system of a compressor into the chamber 13 for shutting down the compressor or for some like control function. The chamber 13 is vented to atmosphere, as described.

The invention is versatile and may be installed on gas scrubbers, industrial pressure vessels, boilers and the like. It may be employed as the interface means between two pressurized fluid systems while monitoring the liquid level of one system and controlling the venting of the associated second fluid system. The advantages of the invention should be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A liquid level monitoring and control fluid system venting device comprising a housing having separated chambers and adapted to be coupled in a liquid receptacle with one chamber in communication therewith, a pivoted float on said housing near said one end including a float arm extending into said one chamber, a vent valve for said control fluid system on the housing near the other end thereof and adjacent the other chamber of the housing and adapted for coupling in said control fluid system to be vented, said vent valve including a control fluid fitting having a tubular extension in said other chamber substantially at right angles to the axis of said housing and the common axis of said chambers, a sleeve valve element slidably mounted on said tubular extension, said sleeve valve element having a vent port and carrying a compressible seal element adapted to abut and close the end of said tubular extension, means resiliently biasing said sleeve valve element to a venting position with said seal element spaced from the end of the tubular extension, said housing having an interface wall separating said chambers, a rotary shaft means extending axially of the housing on said interface wall and operatively coupled with said float arm and said sleeve valve element whereby pivoting of the float arm will shift said sleeve valve element in concert with said biasing means between control fluid venting and nonventing positions.

2. The structure of claim 1, and said sleeve valve element having an end wall opposing the end of said tubular extension and said vent port being a transverse port in the sleeve valve element immediately inwardly of said end wall, and said compressible seal element comprising a rubber-like disc seated on the end wall in opposing relation to the end of the tubular extension and being adjacent said transverse port.

3. The structure of claim 1, and said rotary shaft means comprising an outer relatively stationary shaft section mounted on and extending through said interface wall, a first fluid seal engaging the outer shaft section and interface wall, an interior rotary shaft section journaled in the outer shaft section, and a second fluid seal interposed between said outer and interior shaft sections.

4. The structure of claim 3, and said first and second fluid seals are O-ring seals.

5. The structure of claim 3, and said rotary shaft means additionally comprising a crank extension on the interior rotary shaft section and a slidable driving connecting element engaged with said crank extension and said float arm.

6. The structure of claim 5, and said slidable driving connecting element comprising a U-loop element extending around the float arm and having eyes slidably receiving said crank extension.

7. The structure of claim 3, and said rotary shaft means additionally comprising an eccentric cam on the interior rotary shaft in said other chamber and near said sleeve valve element, and a pivoted rocker plate within said other chamber in contact with the sleeve valve element and said eccentric cam.

8. The structure of claim 7, and a stub shaft carrying said pivoted rocker plate and anchored to said interface wall and being spaced laterally from the axis of the interior rotary shaft and spaced laterally of said sleeve valve element.

9. The structure of claim 1, wherein said control fluid fitting is a screw-threaded fitting secured within a screw-threaded opening in the side wall of said housing adjacent said other chamber.

10. The structure of claim 1, and a transverse pivot shaft assembly for the pivotal support of said float arm and extending through said one chamber.

11. The structure of claim 10, and said pivot shaft assembly comprising a pin having end portions received within side wall openings of said housing, a pair of sleeves on said pin in opposing relation and having inner end threaded extensions, said float arm having a threaded coupling part engaged with said threaded extensions, and compressible annular seals on said pin between the outer ends of the sleeves and housing side wall.

* * * * *